(12) United States Patent  (10) Patent No.: US 9,255,653 B2
Sampson  (45) Date of Patent: Feb. 9, 2016

(54) WRAP BRACKET DAMPER ASSEMBLY

(71) Applicant: Franklin Fastener Company, Redford, MI (US)

(72) Inventor: James M. Sampson, Southfield, MI (US)

(73) Assignee: FRANKLIN FASTENER COMPANY, Redford, MI (US)

( * ) Notice: Subject to any disclaimer, the term of this patent is extended or adjusted under 35 U.S.C. 154(b) by 0 days.

(21) Appl. No.: 14/523,084

(22) Filed: Oct. 24, 2014

(65) Prior Publication Data

US 2015/0041600 A1   Feb. 12, 2015

Related U.S. Application Data

(63) Continuation of application No. 12/731,940, filed on Mar. 25, 2010, now Pat. No. 8,870,132.

(60) Provisional application No. 61/163,106, filed on Mar. 25, 2009.

(51) Int. Cl.
| F16L 3/00 | (2006.01) |
| F16L 3/12 | (2006.01) |
| F16L 3/123 | (2006.01) |
| F16L 3/127 | (2006.01) |
| F16L 3/237 | (2006.01) |
| F16L 55/035 | (2006.01) |
| F16L 3/22 | (2006.01) |

(52) U.S. Cl.
CPC ............... *F16L 3/1211* (2013.01); *F16L 3/123* (2013.01); *F16L 3/127* (2013.01); *F16L 3/22* (2013.01); *F16L 3/237* (2013.01); *F16L 55/035* (2013.01)

(58) Field of Classification Search
USPC .............. 248/73, 74.1, 74.3, 74.4, 62, 63, 71; 24/530, 542, 543
See application file for complete search history.

(56) References Cited

U.S. PATENT DOCUMENTS

| 1,805,006 | A |   | 5/1931 | Neilon |
| 2,455,598 | A |   | 12/1948 | Michalenko |
| 2,466,912 | A |   | 4/1949 | Rice |
| 2,466,921 | A |   | 4/1949 | Tinnerman |
| 3,421,187 | A |   | 1/1969 | Ryder |
| 3,815,855 | A | * | 6/1974 | Appleton .................... 248/74.3 |
| 4,037,810 | A |   | 7/1977 | Pate |
| 4,172,578 | A |   | 10/1979 | Pate |
| 4,189,807 | A |   | 2/1980 | Byerly |
| 4,252,289 | A |   | 2/1981 | Herb |
| 4,991,801 | A |   | 2/1991 | Trumbull |
| 5,435,506 | A |   | 7/1995 | Wiley |
| 5,971,330 | A |   | 10/1999 | Noba et al. |
| 6,152,412 | A | * | 11/2000 | Basickes et al. .............. 248/317 |

(Continued)

*Primary Examiner* — Steven Marsh
(74) *Attorney, Agent, or Firm* — Brooks Kushman P.C.

(57) ABSTRACT

A wrap bracket assembly is provided for securing an elongated member. The assembly includes a bracket with a clamp extending from a base to wrap around the elongated member. The clamp defines an aperture, and includes side edges that extend around the elongated member. The assembly also includes a grommet forming a split tubular body that defines a substantially cylindrical cavity. The body has an axially extending opening through which the elongated member is inserted into the cavity. The body includes a pair of flanges, each of which engages one of the first and second side edges to nest the grommet within the clamp. A projection is provided that extends radially outward from the body and is received in the aperture to circumferentially align the grommet with the bracket.

14 Claims, 6 Drawing Sheets

(56) References Cited

U.S. PATENT DOCUMENTS

| | | | |
|---|---|---|---|
| 6,164,604 A * | 12/2000 | Cirino et al. | 248/74.3 |
| 6,398,170 B1 * | 6/2002 | Wada | 248/74.5 |
| 6,732,982 B1 * | 5/2004 | Messinger | 248/74.1 |
| 6,732,983 B1 | 5/2004 | Blake et al. | |
| 6,892,990 B2 | 5/2005 | Pisczak | |
| 7,467,767 B2 | 12/2008 | Miles et al. | |
| 7,540,071 B2 | 6/2009 | Sampson | |
| 7,546,986 B2 | 6/2009 | Kim | |
| 7,770,848 B2 | 8/2010 | Johnson et al. | |
| 7,959,114 B2 | 6/2011 | Spreitzer et al. | |
| 8,091,839 B2 | 1/2012 | Whipple et al. | |
| 8,973,880 B2 * | 3/2015 | Goffman | 248/230.4 |
| 2005/0098688 A1 | 5/2005 | Miarka et al. | |
| 2007/0257161 A1 * | 11/2007 | Geppert et al. | 248/74.3 |
| 2007/0272806 A1 | 11/2007 | Kim | |
| 2010/0219301 A1 * | 9/2010 | Sampson | 248/74.1 |

* cited by examiner

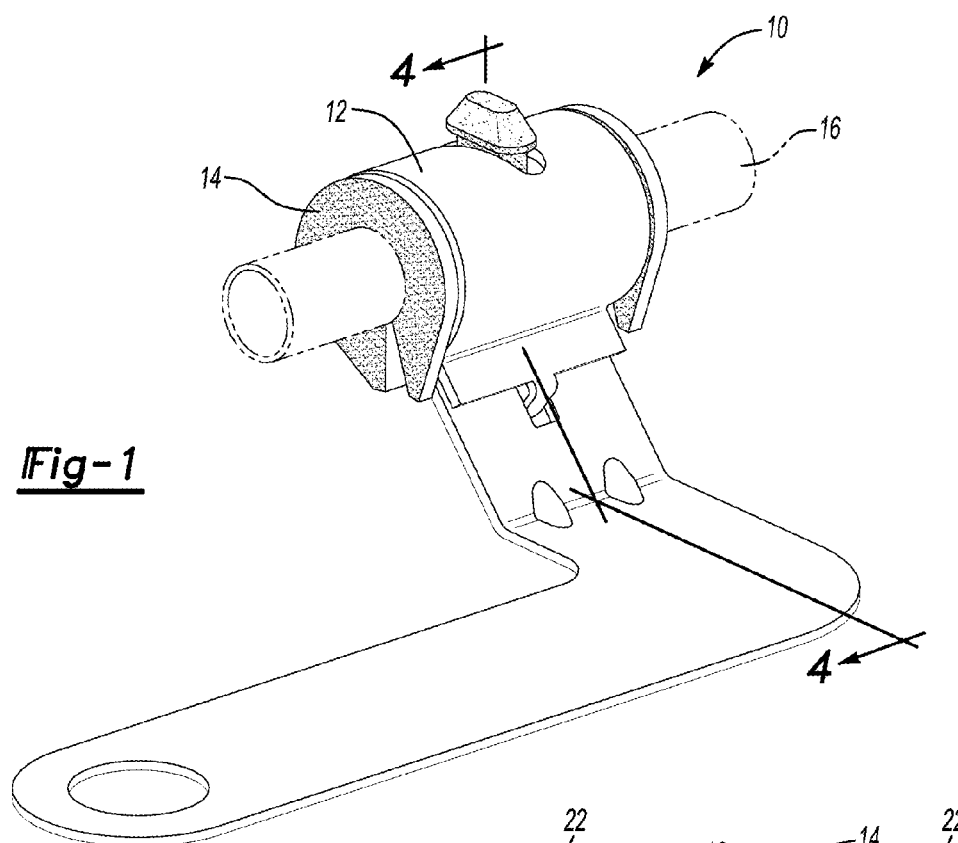
*Fig-1*
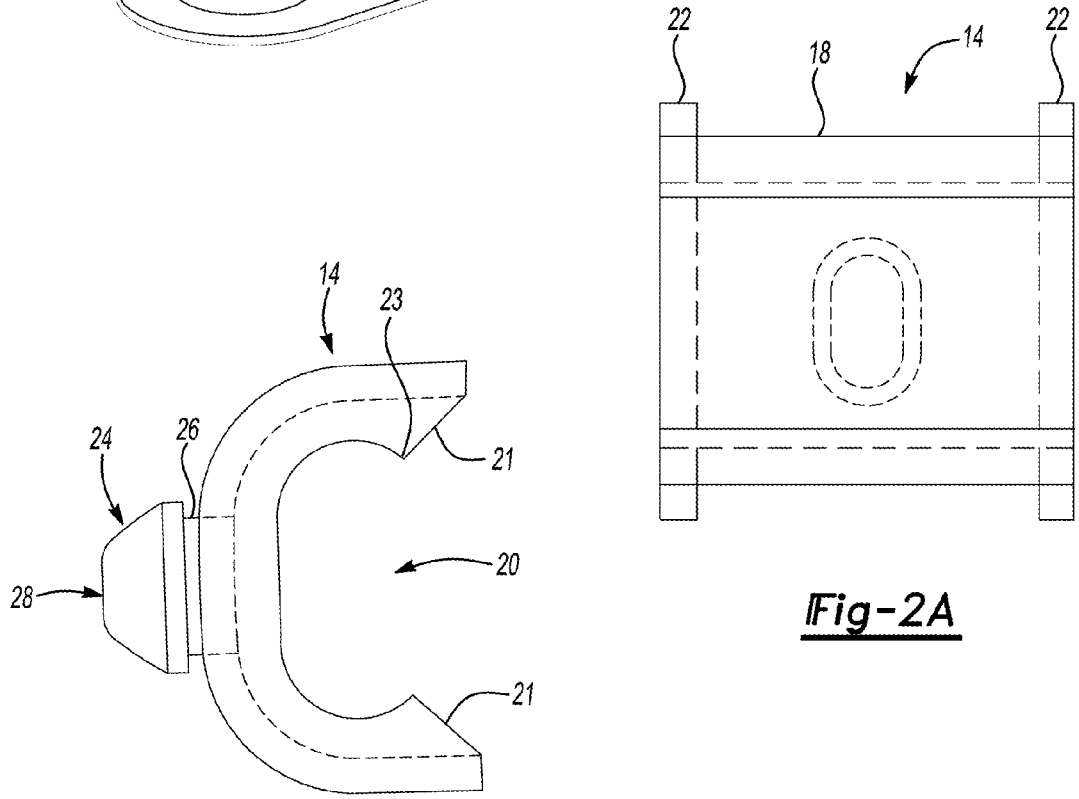
*Fig-2A*
*Fig-2B*

US 9,255,653 B2

WRAP BRACKET DAMPER ASSEMBLY

CROSS-REFERENCE TO RELATED APPLICATIONS

This application is a continuation of U.S. application Ser. No. 12/731,940 filed Mar. 25, 2010, U.S. Pat. No. 8,870,132 issued Oct. 28, 2014, which, in turn, claims the benefit of U.S. provisional Application No. 61/163,106 filed Mar. 25, 2009, the disclosures of which are incorporated in their entirety by reference herein.

TECHNICAL FIELD

The field relates to clamps for tubes, pipes, hoses, ducts, lines, cables and harnesses.

BACKGROUND

One example of a wrap bracket is disclosed U.S. Pat. No. 2,466,921 to Tinnerman. An example of a toothed bracket for securing a tube is disclosed in U.S. Pat. No. 4,037,810 to Pate.

SUMMARY

In at least one embodiment a wrap bracket assembly is provided. The wrap bracket assembly includes a bracket having a base that is adapted to be attached to a surface and a clamp extending from the base and that is adapted to wrap around an elongated member. The clamp defines an aperture, and has first and second axially spaced side edges that extend around the elongated member. The assembly also includes a molded grommet forming a split tubular body that defines a substantially cylindrical cavity. The body has an axially extending opening through which the elongated member is inserted into the cavity. The body also has a pair of flanges, each of which engages one of the first and second side edges to nest the grommet within the clamp. The grommet includes a projection extending radially outward from the body that is received in the aperture to circumferentially align the grommet with the bracket.

In another embodiment, a wrap bracket assembly having an oblong projection is provided. The wrap bracket assembly includes a bracket having a base that is adapted to be attached to a surface and a clamp extending from the base and that is adapted to wrap around an elongated member. The clamp has an inner end that is attached to the base and a distal end opposite the base. The clamp defines a slot. The bracket includes a first engagement feature that extends from the distal end to attach the distal end of the clamp to a second engagement feature provided on the base. The assembly also includes a molded grommet having a split tubular body that has axially opposite sides. The grommet has a plurality of flanges extending radially from the axially opposite sides of the body. The flanges nest the grommet within the clamp. The body forms a cylindrical cavity when in a closed position for supporting the elongated member. The grommet includes an oblong projection extending radially outward from the body that is received in the slot and secures the grommet to the bracket.

In yet another embodiment, a wrap bracket assembly having a toothed grommet is provided. The wrap bracket assembly includes a bracket having a base that is adapted to be attached to a surface and a clamp extending from the base and that is adapted to wrap around an elongated member. The clamp has an inner end that is attached to the base and a distal end opposite the base. The clamp defines an aperture. The assembly also includes a grommet having an elongate body of flexible material having a transverse width and a longitudinal length with a proximal end and a distal end. The body forms a split tubular structure when attached to the bracket and oriented in a closed position. The grommet is provided with a series of longitudinally spaced apart teeth formed along a central portion of the length that extend from a first side of the body. The teeth define a substantially cylindrical cavity with an axially extending opening for supporting the elongated member. The grommet also includes a post formed at the distal end of the length and extending from the first side of the body and a notch defined by the grommet and formed at the proximal end of the length and extending from the first side of the body. The notch receives the post when oriented in the closed position. The grommet also includes a projection extending from a second side of the body that is opposite the first side, wherein the projection is received by the aperture to circumferentially align the grommet with the bracket.

BRIEF DESCRIPTION OF THE DRAWINGS

FIG. 1 is a perspective view of a wrap bracket assembly according to an embodiment of the present invention, illustrated supporting an elongated member;

FIG. 2A is a bottom plan view of a grommet of FIG. 1;

FIG. 2B is a side elevation view of the grommet of FIG. 2A;

DETAILED DESCRIPTION

Figure 3:
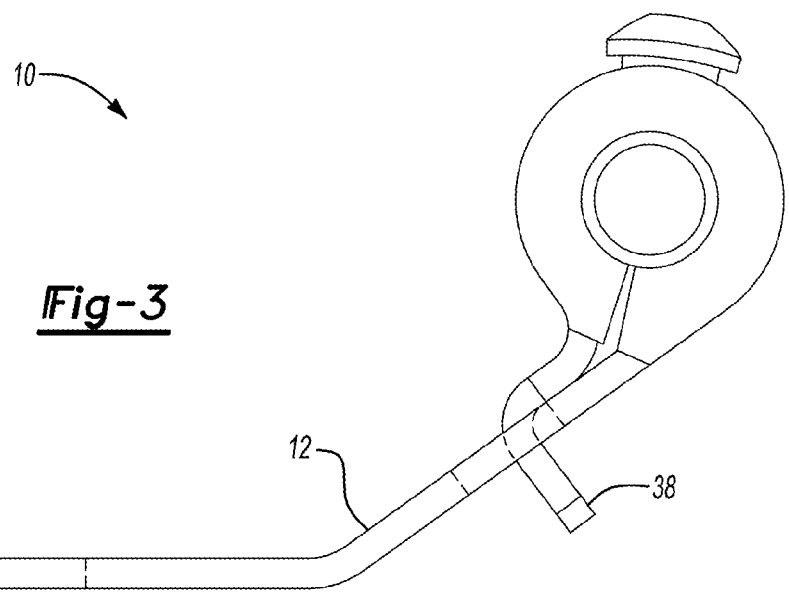
FIG. 3 is a side elevation view of the wrap bracket assembly of FIG. 1, illustrated in a closed assembly position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1, a wrap bracket assembly is illustrated in accordance with an embodiment of the present invention and is referenced by numeral 10. The wrap bracket assembly 10 includes a wrap bracket 12 assembled about a grommet 14. Once assembled, the wrap bracket assembly 10 is fastened to a supporting surface to secure a tube 16. The wrap bracket assembly 10 may be used to secure a variety of tubes including: pipes, hoses ducts, lines, cables and harnesses. An exemplary example of one such application of a wrap bracket assembly is to secure power steering lines on an automotive vehicle.

Referring to FIGS. 1-2B, the grommet 14 is sized to attach to a wrap bracket 12 and to conform to the outer diameter of the tube 16. The grommet 14 is a molded elastic material, such as EPDM, Neoprene, Silicone, HNBR, Nitrile or Viton®. The material selected for the grommet 14 will preferably have a Shore Durometer Hardness between 60-80 Shore A.

The grommet 14 is molded in an open position, providing a split tubular grommet body 18 having a partially cylindrical shape. An axially extending opening 20 is formed along the length of the body 18. The opening 20 may be formed during the mold process as opposed to cutting the opening 20 afterwards. By incorporating the opening 20 into the mold process, a pair of smooth lead-in surfaces 21 are created. The lead-in surfaces 21 each include a raised tip 23. The dimension between the opposing raised tips 23 when assembled may be less than the inner diameter of the grommet 14. The lead-in features 21 with the raised tips 23 may provide a "Snap-fit" as the wrap bracket assembly 10 engages a tube 16. This "Snap-fit" provides positive feedback to confirm proper assembly to the tube 16.

Alternative embodiments of the grommet are envisioned where the grommet is "molded closed". An opening for this grommet could be cut after the mold process.

The grommet 14 is designed such that when it is closed, as seen in FIG. 1, the body 18 assumes a generally cylindrical shape, having an ovate cross section with a circular inner diameter that forms a cylindrical cavity. A pair of flanges 22 radially extend from the body 18. An oblong projection 24 extends from a mid portion of the body 18 in a direction that is diametrically opposite to the opening 20. The projection 24 includes a shaft 26 with an oblong tapered head 28, the width of the head 28 may be larger than that of the shaft 26.

Figure 4:
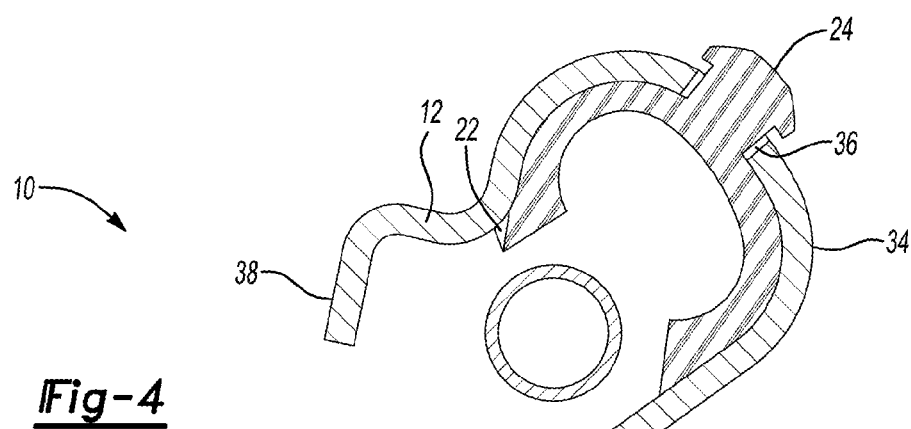
FIG. 4 is a side sectional elevation view of the wrap bracket assembly of FIG. 1, taken along the line 4-4 and illustrated in an open assembly position.

With reference to FIGS. 3-4, the wrap bracket 12 is generally a single stamping that secures a tube 16 by wrapping around it. The wrap bracket 12 includes a planar base, such as mounting portion 30 for mounting the bracket 12 to a surface. The mounting portion 30 includes a fastener aperture 32 for receiving a fastener (not shown). A clamp, such as curved portion 34 of the bracket 12 extends from the mounting portion 30. An elongated slot 36 extends through the curved portion 34. The slot 36 is sized for receiving the oblong projection 24.

The projection 24 facilitates retaining the grommet 14 within the wrap bracket 12. Projection 24 is sized such that the width of the tapered head 28 is greater than the width of the slot 36. Therefore the head 28 temporarily deforms to pass through the slot 36, and then the head 28 returns to its original shape to retain the grommet 14 to the bracket 12.

The oblong shape of the projection 24 as well as the flanges 22 help locate the grommet 14 within the wrap bracket 12. The grommet 14 is sized such that the perpendicular distance between the flanges 22 is slightly larger than the width of the bracket 12, which allows the grommet 12 to nest within the curved portion 34 of the bracket 12. The oblong shape of the projection 24 prevents the grommet 14 from rotating relative to the bracket 12.

The wrap bracket assembly 10 is illustrated in a closed position in FIG. 3 and an open position in FIG. 4. The wrap bracket 12 includes a tab 38 that transversely extends from a distal end of the wrap bracket 12. A tab-slot 40 is positioned between the mounting portion 30 and the curved portion 34 for receiving the tab 38. During installation, a user engages the tube 16 with the open wrap bracket assembly 10, as illustrated in FIG. 4. Once the tube 16 is engaged the user bends the wrap bracket assembly 10 to the closed position of FIG. 3, and inserts the tab 38 into the slot 40. The closed position of the wrap bracket assembly 10 is maintained by plastic deformation of the wrap bracket 12.

Figure 5:
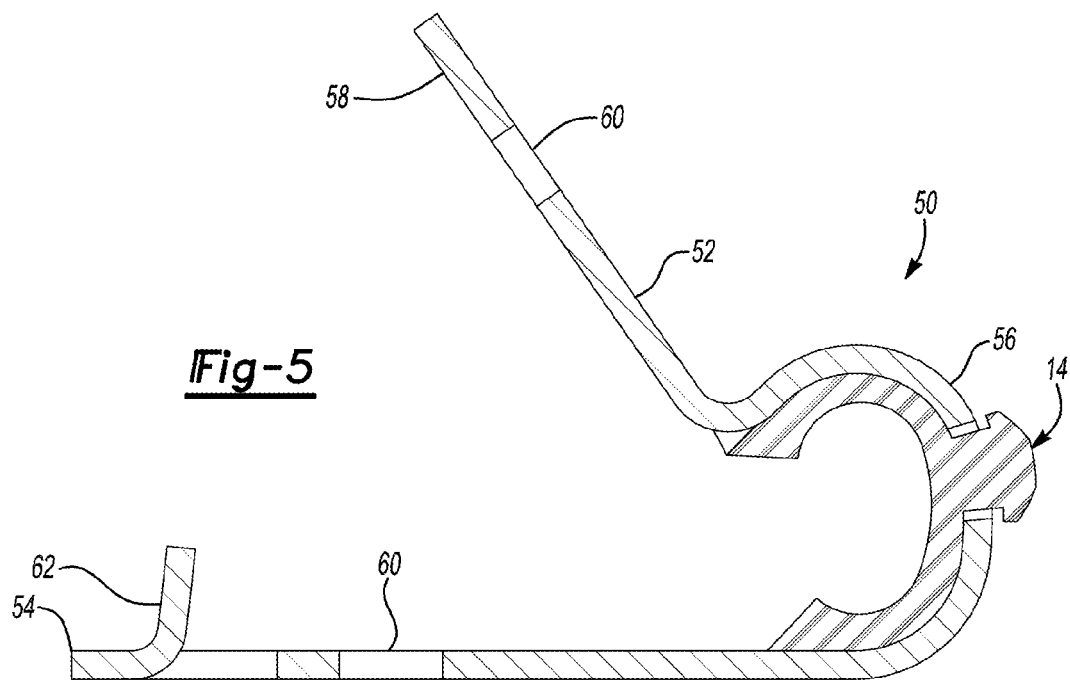
FIG. 5 is a side sectional elevation view of a wrap bracket assembly according to another embodiment of the present invention, illustrated with a "R" shaped bracket.

FIG. 5 illustrates another embodiment of the wrap bracket assembly, generally referenced by numeral 50. Wrap assembly 50 is generally a bracket that secures a tube (not shown) by wrapping around it, and includes a temporary locking feature. Wrap Assembly 50 includes an R-shaped wrap bracket 52. The bracket 52 includes a planar base, such as mounting portion 54 and a planar locking portion 58 connected to each other by a clamp, such as curved portion 56. The mounting portion 54 includes a fastener aperture 60 for receiving a fastener (not shown) to secure the wrap assembly 50 to an underlying surface. The mounting portion 54 also includes a retention tab 62 that extends in a generally upright direction therefrom. The clamp, such as curved portion 56 is sized for receiving the grommet 14. The locking portion 58 also includes a fastener aperture 61. The retention tab 62 and the locking portion 58 are sized to provide a partial interference fit between them when the assembly 50 is bent into a closed position (not shown). The interference fit provides a temporary locking feature that may be utilized during shipping or during assembly, and prior to inserting a fastener into the fastener apertures 60, 61.

Figure 6:
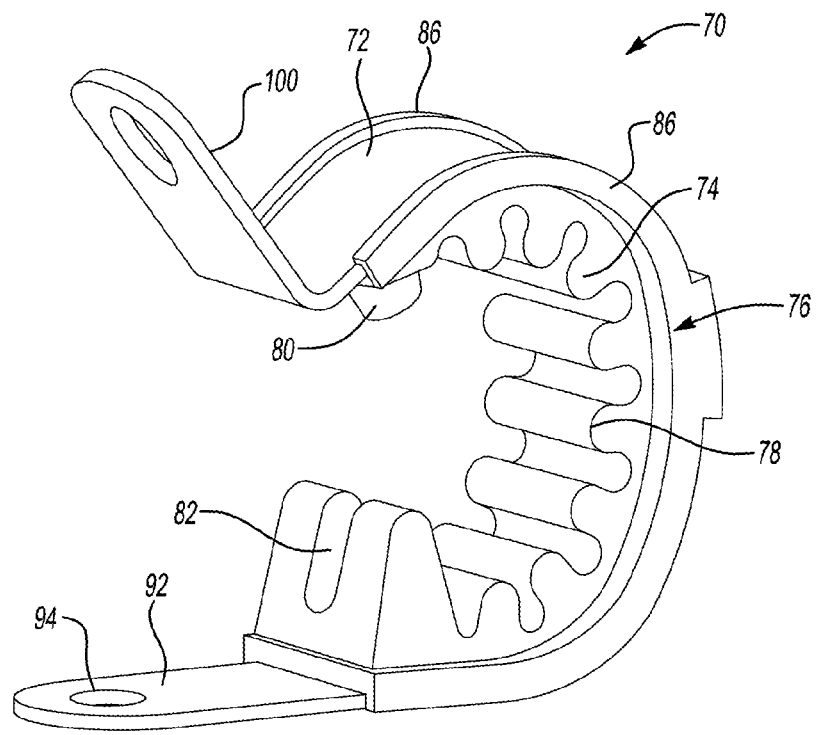
FIG. 6 is a perspective view of a wrap bracket assembly according to yet another embodiment of the present invention, illustrated in an open position.
Figure 7:
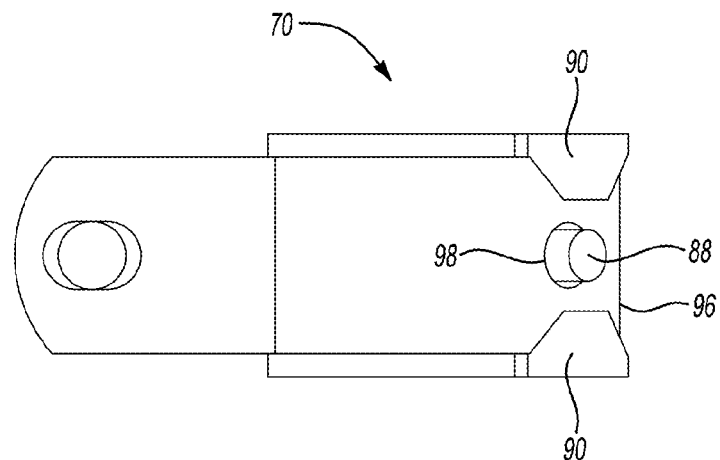
FIG. 7 is a top plan view of the wrap bracket assembly of FIG. 6.
Figure 8:
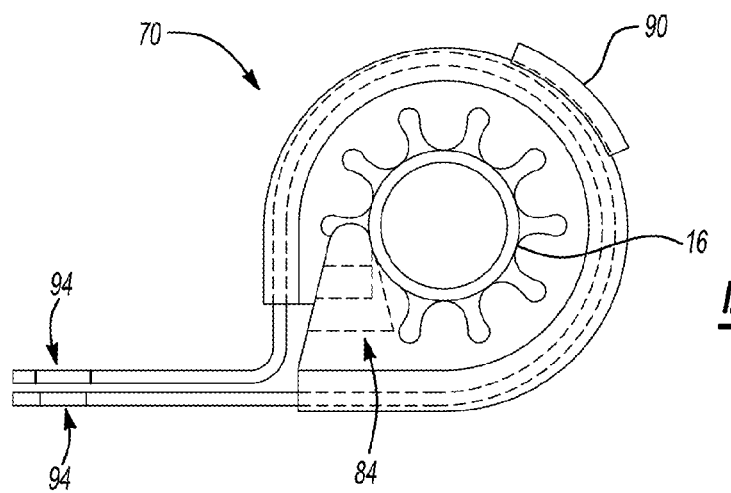
FIG. 8 is a side elevation view of the wrap bracket assembly of FIG. 6, illustrated in a closed position.

With reference to FIGS. 6-8, a wrap bracket assembly having a toothed grommet is illustrated in accordance with another embodiment of the present invention and is referenced by numeral 70. The wrap bracket assembly 70 includes a wrap bracket 72 assembled about a toothed grommet 74. Once assembled, the wrap bracket assembly 70 may be fastened to a surface to secure a tube 16 in place. The wrap bracket assembly 70 may be used to secure a variety of tubes including: pipes, hoses ducts, lines, cables and harnesses. An example of one such application of a wrap bracket assembly is to secure HVAC lines on an automotive vehicle.

The toothed grommet 74 is sized to attach to the wrap bracket 72 and to conform to the outer diameter of the tube 16. The grommet 74 is formed of a molded elastic material, such as EPDM, Neoprene, Silicone, HNBR, Nitrile or Viton®. The material selected for the grommet 74 will preferably have a Shore Durometer Hardness between 60-80 Shore A.

The toothed grommet 74 is molded in an open position, providing a grommet body 76 having an elongate shape, with a transverse width and a longitudinal length. A series of transverse teeth 78 extend from the body 76. The teeth are formed to evenly engage the circumference of the tube 16. The grommet 74 includes a generally cylindrical post 80 extending from a distal end of the body 76. A notch 82 is formed at the opposite end of the body 76. The notch 82 is sized for receiving the post 80. The post 80 and the notch 82 cooperate to provide an alignment feature for the wrap bracket assembly 70. The alignment feature is positioned at an opening 84 of the wrap bracket assembly 70.

The toothed grommet 74 is designed such that when it is closed, the body 76 assumes a generally cylindrical shape, having a cross section with teeth 78 that extend radially inward to form a generally cylindrical cavity with a circular inner diameter. A pair of flanges 86 radially extend from the body 76. A cylindrical projection 88 radially extends from a mid portion of the body 76 in a direction that is diametrically opposite to the opening 84. A pair of opposing flaps 90 extend transversely from the flanges 86 toward the projection 88.

The wrap bracket 72 is generally a single stamping that secures a tube 16 by wrapping around it. The wrap bracket 72 includes a planar base, such as mounting portion 92 for mounting the bracket 72 upon an underlying surface. The mounting portion 92 includes a fastener aperture 94 for receiving a fastener (not shown). A clamp, such as curved portion 96 of the bracket 72 extends from the mounting portion 92. The curved portion 96 includes an aperture 98 that extends through the bracket. The aperture 98 is sized for receiving the cylindrical projection 88. The bracket 72 includes a planar locking portion 100 extending from the curved portion 96. The locking portion 100 also includes a fastener aperture 95, that aligns with the fastener aperture 94 of the mounting portion 92, when the bracket assembly 70 is in the closed position (FIG. 8).

The projection 88 as well as the flanges 86 help locate the grommet 74 to the wrap bracket 72. The grommet 74 is sized such that the perpendicular distance between the flanges 86 is slightly larger than the width of the bracket 72, which allows the grommet 74 to nest within the curved portion 96 of the bracket 72. The flaps 90 help retain the grommet 74 to the bracket 72.

The wrap bracket assembly 70 is illustrated in an open position in FIG. 6 and an closed position in FIG. 8. During installation, a user engages the tube 16 with the open wrap bracket assembly 70. Once the tube 16 is engaged the user bends the wrap bracket assembly 70 to the closed position of FIG. 8. The closed position of the wrap bracket assembly 70 is partially maintained by plastic deformation of the wrap bracket 72, until the user securely mounts the assembly 70 using a fastener (not shown).

Figure 9:
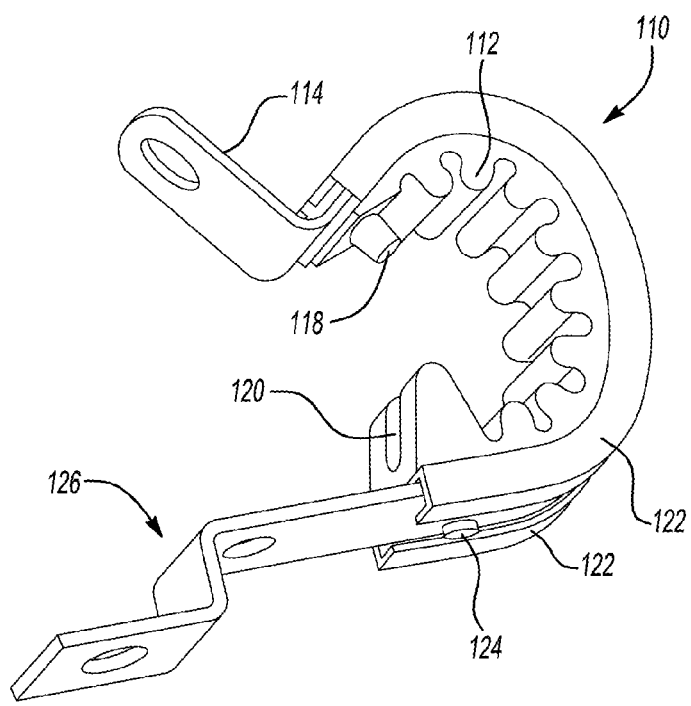
FIG. 9 is a perspective view of a wrap bracket assembly according to still another embodiment of the present invention, illustrated in an open position.

FIG. 9 illustrates yet another embodiment of the wrap bracket assembly that is generally referenced by numeral 110. This embodiment includes, a toothed grommet 112 having a pair of channels 122 extending the length of the lateral edges of the grommet 112. The channels 122 help retain the grommet 112 on a bracket 114. The grommet includes an alignment feature having a post 118 and a notch 120. Additionally a grommet post 124 outwardly extends from the grommet 112, opposite the notch 120. During assembly of the grommet 112 to the bracket 114, the channels 122 are peeled open to engage the bracket 114 and released so that the channels 122 retain the grommet 112 to the bracket 114. The mounting bracket 114 includes a step 126 to offset the grommet 112 from the underlying surface. Such an offset 126 may be used for packaging purposes, or to prevent the channels 122 or post 124 from contacting the underlying surface.

Figure 10:
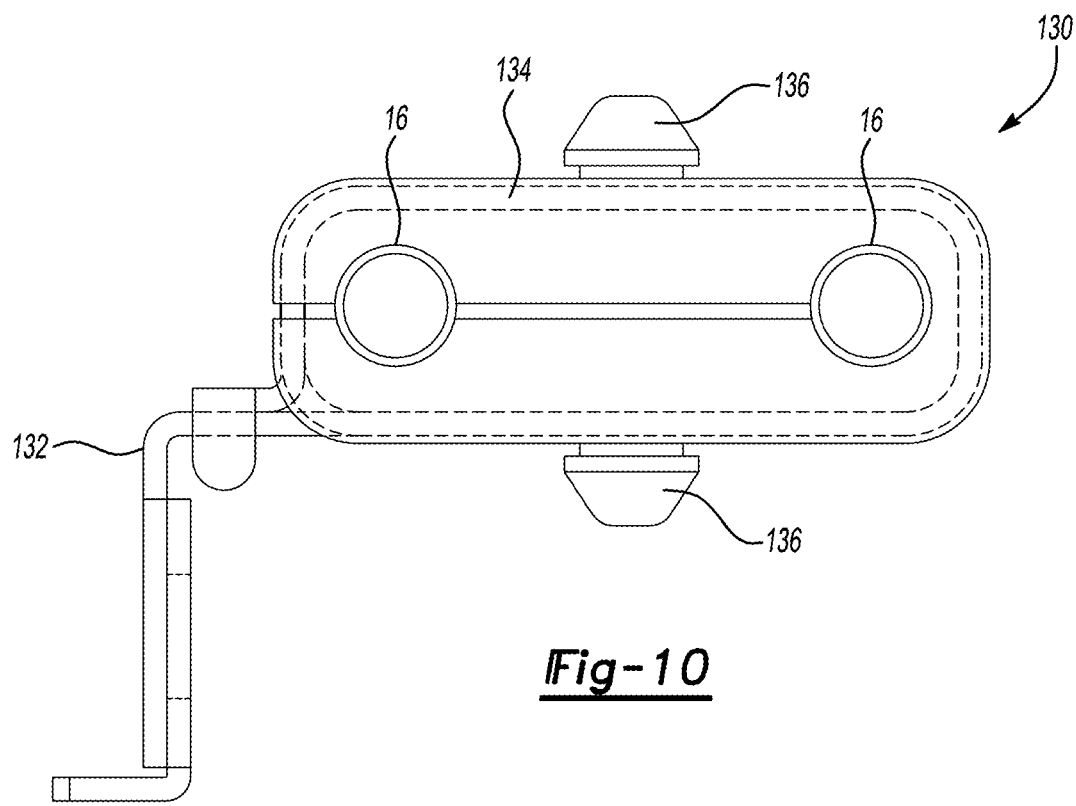
FIG. 10 is a side elevation view of a wrap bracket assembly according to another embodiment of the present invention, illustrated with a dual tube grommet having oblong projections.
Figure 11:
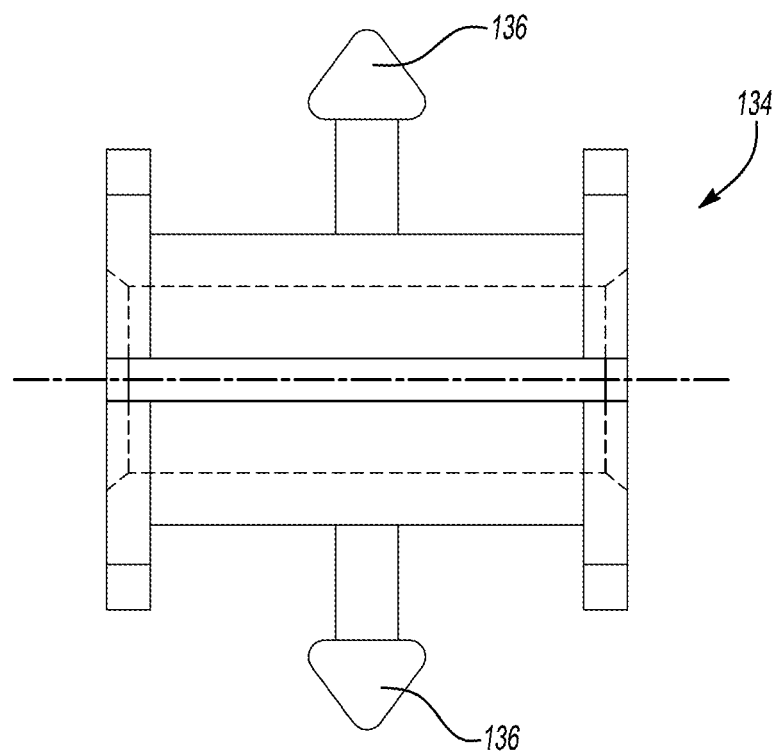
FIG. 11 is a front elevation view of the grommet of FIG. 10.

With reference to FIGS. 10 and 11, a wrap bracket assembly having a dual tube grommet with oblong projections is illustrated in accordance with another embodiment of the present invention and is referenced by numeral 130. The wrap bracket assembly 130 includes a wrap bracket 132 assembled about a dual tube grommet 134. Once assembled, the wrap bracket assembly 130 is fastened to an underlying surface to secure a pair of tubes 16. The wrap bracket assembly 130 may be used to secure a variety of tubes including: pipes, hoses ducts, lines, cables and harnesses. An example of one such application of a wrap bracket assembly 130 is to secure both the pressure and return power steering lines on an automotive vehicle.

The dual tube grommet 134 is generally rectangular in shape. The grommet 134 includes a pair of cavities projecting through the grommet 134 for receiving a pair of tubes 16. The grommet 134 also includes a pair of oblong projections 136 for securing the grommet 134 to the wrap bracket 132. The oblong projections 136 extend from opposite sides of the grommet 134. The projections 136 are received by corresponding slots (not shown) of the wrap bracket 132 for retention. Alternate embodiments of the wrap bracket assembly 130 envision a grommet having only one, or more than two oblong projections extending therefrom. Additional alternate embodiments envision a multi-tube grommet configured for more than two tubes, (e.g. a three or four tube grommet).

Figure 12:
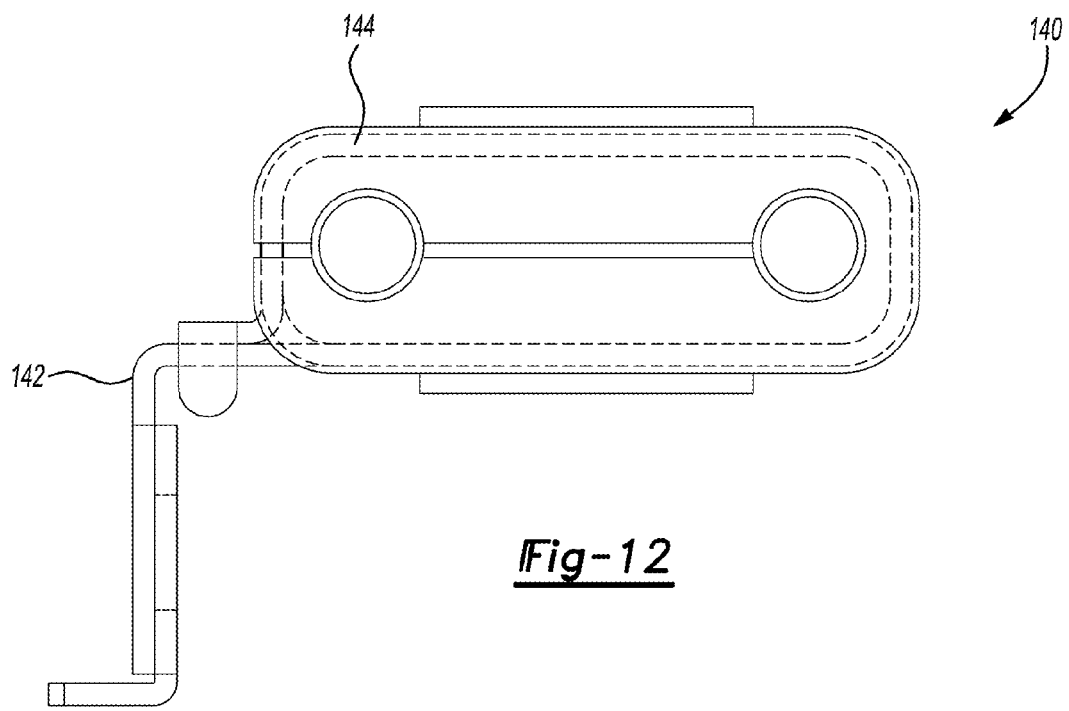
FIG. 12 is a side elevation view of a wrap bracket assembly according to another embodiment of the present invention, illustrated with a channeled dual tube grommet.
Figure 13:
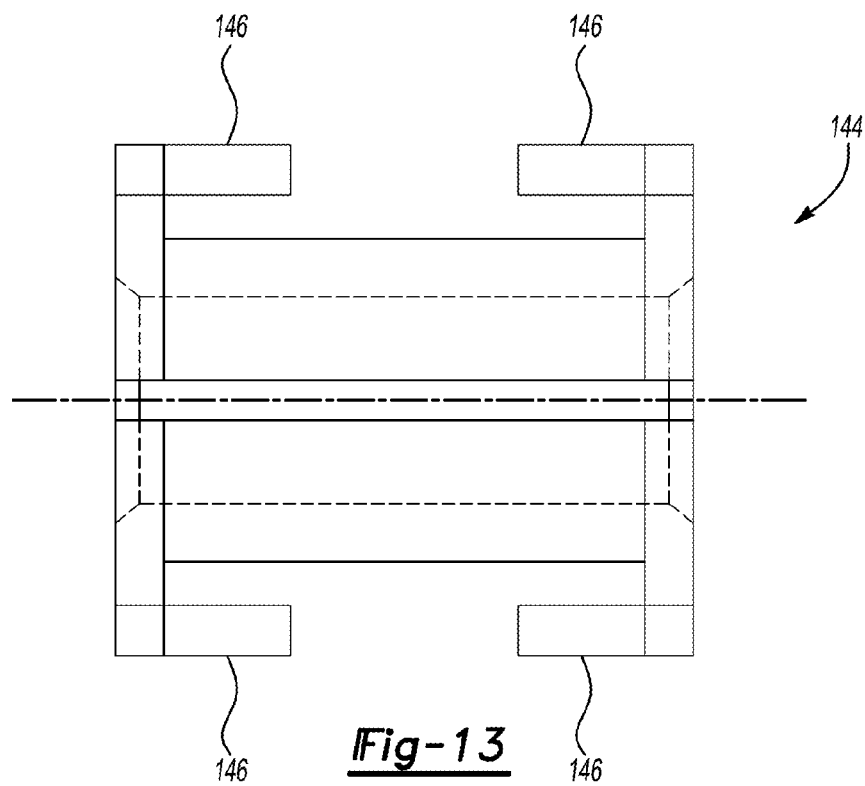
FIG. 13 is a front elevation view of the grommet of FIG. 12.

FIGS. 12-13 illustrate a wrap bracket assembly having a dual tube channeled grommet, in accordance with another embodiment of the present invention and is referenced by numeral 140. The wrap bracket assembly 140 includes a wrap bracket 142 assembled about a dual tube channeled grommet 144. The channeled grommet 144 includes a pair of channels 146 disposed over a portion of opposing sides of the grommet 144. The channels 146 help retain the grommet 144 to the bracket 142.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. Additionally, the features of various implementing embodiments may be combined to form further embodiments of the invention.

What is claimed is:

1. A wrap bracket assembly comprising:
a bracket having a base adapted to mount to a surface, the bracket further having a curved clamp extending from the base and adapted to wrap around an elongate tube, the clamp having an inner surface and an outer surface with an aperture extending between the inner and outer surfaces, wherein the bracket is capable of deforming from an open position to a closed position in which a distal end of the curved clamp aligns with the base; and
a rubber grommet having a split body enabling the grommet to deform between an open position to receive the elongate tube and a closed position, the grommet further having an oblong projection extending from an outer surface of the split body that is received by the aperture of the bracket, the oblong projection having a length extending in a direction of a length of the outer surface such that the projection extends length-wise along the outer surface, the split body having at least one opening wall defining a generally cylindrical opening adapted to receive the elongate tube therein, the opening wall having a plurality of spaced apart rubber teeth extending radially inward from the opening wall to engage the outer surface of the split body when the grommet is in the closed position for supporting the tube,
wherein the split body of the grommet includes a first end surface and a second end surface that move toward one another when the grommet is deformed from the open position toward the closed positions, the first and second end surfaces having respective engagement regions adapted to engage with one another when the grommet is in the closed position.

2. The wrap bracket assembly of claim 1, wherein the plurality of spaced apart teeth comprise longitudinal ribs that extend longitudinally from a first end of the split body to a second end of the body.

3. The wrap bracket assembly of claim 1, wherein the plurality of spaced apart teeth are annularly spaced about the opening.

4. The wrap bracket assembly of claim 1, wherein the grommet further comprises a first side surface and a second side surface, wherein a central axis of the opening extends from the first side surface to the second side surface, and wherein the teeth comprise ribs that extend longitudinally in the direction of the axis from the first side surface to the second side surface.

5. The wrap bracket assembly of claim 1, wherein the projection comprises a shaft extending from the body and an oblong head extending from a distal end of the shaft.

6. The wrap bracket assembly of claim 5, wherein the oblong head has a width exceeding that of the aperture such that the oblong head deforms when inserted through the aperture to secure the outer surface of the grommet to the inner surface of the bracket.

7. The wrap bracket assembly of claim 1, wherein the grommet includes a pair of opposing flanges extending radially outward from opposing side surfaces of the split body, wherein the bracket is configured to wrap around the outer surface of the split body and is located between the pair of opposing flanges.

8. A grommet for a wrap bracket assembly, the grommet comprising
- a rubber split body enabling the grommet to deform from an open position to a closed position, the body defining an outer surface configured to be overlapped by an inner surface of a curved bracket;
- a pair of opposing flanges on respective opposing sides of the body, wherein the flanges extend about a perimeter of the body and define a bracket-receiving surface between the flanges;
- an oblong projection extending from the bracket-receiving surface configured to be received within an aperture in the bracket to secure the grommet to the bracket, the oblong protection having a length extending in a direction of a length of the outer surface of the body; and
- at least one opening wall extending between the flanges, each of the at least one opening wall defining a generally cylindrical opening when the grommet is in the closed position with a central axis of the opening extending in a direction perpendicular to outer surfaces of the flanges, each of the at least one opening wall further defining a plurality of spaced apart rubber teeth extending radially inward from the opening wall when the grommet is in the closed position for supporting an elongate tube within the opening;
- wherein the split body includes a first end surface and a second end surface that move toward one another when the grommet is deformed from the open position toward the closed positions, the first and second end surfaces having respective engagement regions adapted to engage with one another when the grommet is in the closed position.

9. The grommet of claim 8, wherein the teeth are ribs that extend longitudinally between the flanges.

10. The grommet of claim 8, wherein the teeth are annularly spaced about the opening.

11. The grommet of claim 8, wherein the projection includes a shaft extending from the bracket-receiving surface and an oblong head extending from the shaft.

12. The grommet of claim 11, wherein the oblong head has a width exceeding that of the aperture such that the oblong head deforms when assembled through the aperture.

13. The grommet of claim 8, wherein the split body defines a split extending between the outer surface of the body and one of the at least one opening walls.

14. The grommet of claim 13, wherein the at least one opening wall includes two opening walls, each of the two opening walls supporting one elongate tube, wherein the split body further defines a second split extending between the two opening walls.

* * * * *